(No Model.)

M. HARMON.
CAR COUPLING.

No. 495,132. Patented Apr. 11, 1893.

WITNESSES

INVENTOR
Martin Harmon
By Ruff & Johns
his Attorneys

UNITED STATES PATENT OFFICE.

MARTIN HARMON, OF BLOOMINGTON, ILLINOIS.

CAR-COUPLING.

SPECIFICATION forming part of Letters Patent No. 495,132, dated April 11, 1893.

Application filed December 7, 1892. Serial No. 454,350. (No model.)

*To all whom it may concern:*

Be it known that I, MARTIN HARMON, a citizen of the United States, residing at Bloomington, in the county of McLean and State of Illinois, have invented certain new and useful Improvements in Car-Couplings; and I do hereby declare the following to be a full, clear, and exact description of the invention, such as will enable others skilled in the art to which it appertains to make and use the same.

My invention relates to certain new and useful improvements in automatic car couplings and is in the nature of an improvement on the car coupling for which Letters Patent were granted to me on the 11th day of August, 1885, No. 324,108, and it consists in the novel and improved construction and arrangement of parts hereinafter fully described and afterward definitely pointed out in the claims, due reference being had to the accompanying drawings forming a part of this specification, wherein:—

Figure 1:
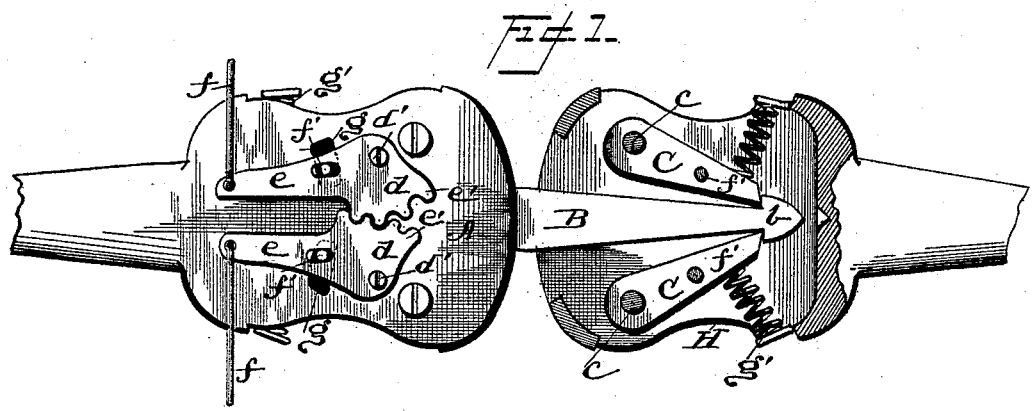
Figure 2:
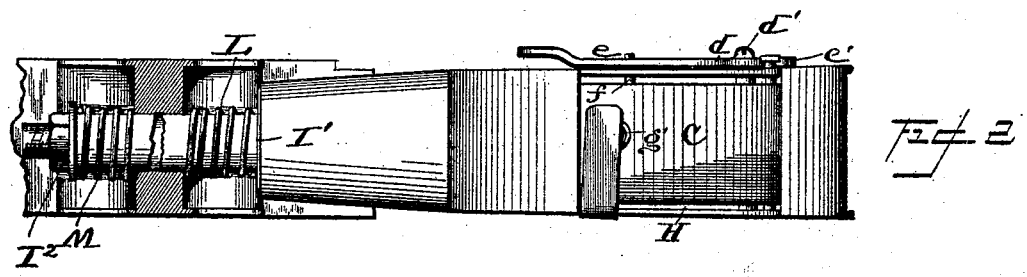
Figure 3:
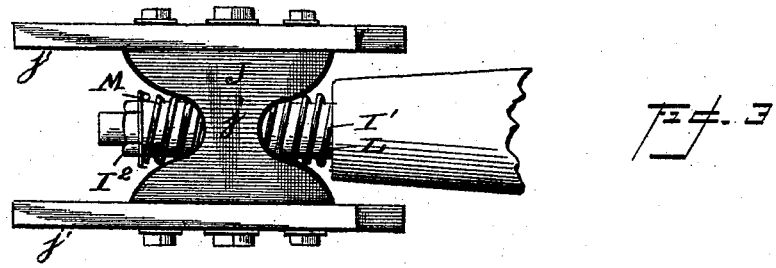
Figure 4:
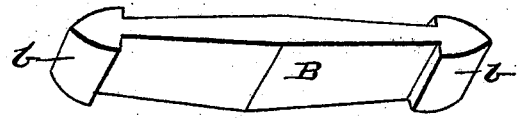

Figure 1 is a top plan view of one draw-head, showing the exterior construction, and a horizontal section of the other draw-head showing the interior construction, the two being shown coupled together. Fig. 2 is a side elevation, partly in section, of the improved coupling; Fig. 3 a detail plan view of the rear end of the draw-bar and the draw-block, and Fig. 4 a perspective view of the coupling bar.

Referring to the drawings the letter A indicates the draw-head; B the coupling bar provided at each end with an arrow-head $b$, said arrow-heads entering the draw-heads of opposite cars. Within the draw-head are disposed opposite each other two wings or arms C hinged to turn on pins $c$ in the forward end of the said draw-head. Said wings extend back to the rear of the draw-head and engage the coupling bar B back of the arrow-head, when the cars are coupled together.

To enable the wings to be disengaged from the coupling bar to uncouple the cars, I provide the following mechanism. Directly upon top of the draw-head and over each wing are pivoted the levers $d$ and $d$, turning on pins or bolts $d'$ $d'$ as their fulcra. The short arm $e$, $e$, is curved around toward the center line of the draw-head, and are each provided with teeth $e'$ $e'$, the teeth of one lever meshing with those of the other, as clearly shown in Fig. 1, for the purpose of causing the two levers to operate simultaneously and in unison. The long arm of each lever extends back as shown, and has attached to its extreme end a rod or chain $f$ which extends to the side, top or platform of the car, within reach of the operator. A rod or pin $f'$ is passed vertically through each lever at or about the middle of the long arm (see Fig. 1) and extends to and connects with the wing C directly underneath, passing through a slot $g$ cut in the top of the draw-head. These rods $f'$ may be screw-threaded at their lower ends to securely engage the wings C. As one of the rods $f$ is now pulled the levers are turned with the long arms away from each other, thus spreading apart, and at the same time causing the rods $f'$ of each lever to turn their respective wings back and out of engagement with the coupling bar arrow-head.

As thus constructed my invention corresponds in all respects to that shown and described in my before named Letters Patent.

In my present invention the draw-head is made with open sides H whereby any snow or ice entering the draw-head from the forward open end at the point the coupling bar enters will not permanently lodge inside of the draw-head and interfere with the operation of the wings, and even if it should the action of said wings will remove the same through the open sides H.

Instead of interposing a spring between the long arms of the levers $e$, $e$, upon the top of the draw-head, as in my former patent, I arrange a coiled spring $g'$ in each of the openings H in the sides of the draw-head, one end of each of said springs bearing against one of the wings C and the other end bearing against a portion of the side wall of the draw-head, said springs exerting a pressure to force the rear ends of the wings inwardly to engage the arrow-head of the coupling bar. By this construction the springs are housed within the draw-head, instead of being arranged upon the top thereof, and are protected against snow, ice and sleet, which would otherwise tend to interfere with their free and sure operation.

I will now proceed to describe my improved means for securing the draw-bar to the frame of the car.

J indicates the draw-block consisting of a solid casting having a central web $j$ connecting two side flanges $j'j'$, the latter being provided with bolt holes for the passage of bolts by means of which the block is firmly secured to the car frame, and the central web $j$ being centrally apertured for the passage therethrough of the rear end of the draw-bar. The rear end of the draw-bar is reduced and projects through the apertured web $j$ of the draw-block J and about said reduced ends upon opposite sides of the web $j$ are disposed coiled springs L and M, the spring L being confined between the web $j$ and a shoulder I' on the draw-bar and the spring M being confined between said web and nuts $I^2$ tapped upon the extreme end of the draw-bar. The spring L is preferably stronger than the spring M, as the jar or thrust occasioned by backing one car against another being more violent than that resulting from starting the train. Owing to the configuration of the draw-block above described the springs are securely housed or seated between the flanges $j'$, $j'$, and thoroughly protected thereby, while a draw-block of exceeding strength and rigidity is obtained.

Having described my invention, what I claim is—

1. In a car coupling, the combination with the draw bar A having open sides, of the wings C pivoted therein, the levers $d$ geared together and provided with pins engaging said wings, springs $g'$ for forcing the rear ends of said wings inwardly, and a coupling bar B, substantially as shown and described.

2. In a car coupling the combination with the draw-head A having open sides, of the wings C pivoted therein the levers $d$ geared together and provided with pins $f'$ engaging said wings, springs $g'$ arranged in said open sides of the draw-head and confined between the side walls thereof and said wings, and a coupling bar B, substantially as shown and described.

In testimony whereof I have signed this specification in the presence of two subscribing witnesses.

MARTIN HARMON.

Witnesses:
J. M. JORDAN,
DANIEL CURLEY.